Figure 1:
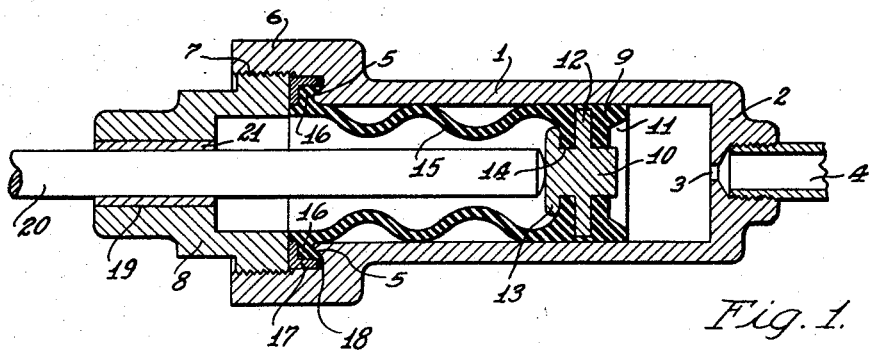

Aug. 22, 1939.   C. SAUZEDDE   2,170,574
HYDRAULIC SEAL

Filed Aug. 17, 1935

INVENTOR.
Claude Sauzedde
BY
ATTORNEYS

Patented Aug. 22, 1939

2,170,574

UNITED STATES PATENT OFFICE 2,170,574

HYDRAULIC SEAL

Claude Sauzedde, Detroit, Mich., assignor to Detroit Hydrostatic Brake Corporation, Detroit, Mich., a corporation of Michigan Application August 17, 1935, Serial No. 36,622

8 Claims. (Cl. 60—54.6)

The present invention relates to means for applying pressure on liquid in a cylinder or tube, or alternatively, means for receiving the pressure of liquid for the purpose of imparting movement to a movable member. The invention is particularly adapted for use in combination with hydraulic brake systems and is applicable to the so-called "compressor", which comprises the means for placing the liquid in a brake system under pressure, and also to the brake shoe actuating means which ordinarily comprises a piston and cylinder arrangement.

The primary object of the present invention is to provide means of the above mentioned character which is non-leakable. In other words, the means which may be operated to place the brake system liquid under pressure, or alternatively, to receive the pressure of the liquid, is constructed whereby it provides its own seal against leakage of liquid from the system. The importance of efficient liquid sealing means in a brake system is readily apparent to those skilled in the art, it being well known that the comparatively high fluid pressures employed create a tendency for the liquid to escape and when the proper amount of liquid is not present in a brake system it cannot function properly. When a reverse condition is present in a brake system, that is, when there is not sufficient liquid to completely fill the system the liquid in the system is under pressure less than atmospheric pressure with the result that there is a tendency for air to enter the system. Air in the brake system is detrimental to efficient brake operation because it is compressible and forms a cushion. Experience with hydraulic brake systems of the past has taught that the most important consideration in sealing a brake system is to effectively exclude the air, and prior sealing means now in use have not proven successful in this respect when the systems are subjected to use over a long period of time under varying temperature conditions.

When the fluid moving parts or the parts moved by the fluid have become worn through use, or have become scratched as sometimes occurs as the result of small particles of grit getting between the moving surfaces the tendency is for the liquid to leak through the small channels thus formed when it is placed under pressure by the actuator, and when the pressure is removed a space is created in the system which atmospheric air enters through such channels. Accordingly it is an important object of this invention to provide means for effectively excluding air from brake systems regardless of the length of time the system is in service. This is accomplished by providing sealing means which functions whereby wear conditions and scratches do not reduce its effectiveness.

Another object of the invention is to provide a piston in a cylinder for applying pressure to a liquid, or alternatively, for receiving pressure of the liquid, the said piston having an elastic skirt which is sealed, at the end remote from the piston head, with respect to the cylinder wall.

Still another object of the invention is to provide a piston constructed of elastic material and having a metallic reinforced head, the metallic reinforcement in the head being for the purpose of preventing collapse of the piston under pressure and the purpose of the elastic construction being to permit the extremity of the piston skirt to be permanently secured to the wall of the cylinder in which the piston operates. The piston head, when placed under fluid pressure, is pressed against the wall of the cylinder to provide a liquid seal and the piston skirt, being secured to the cylinder wall, provides a secondary seal of a more positive nature and prevents the escape of liquid which might seep past the piston head after the device has been in use for a long period of time.

With the above and other ends in view the invention is more fully disclosed with reference to the accompanying drawing, in which—

Figure 2:
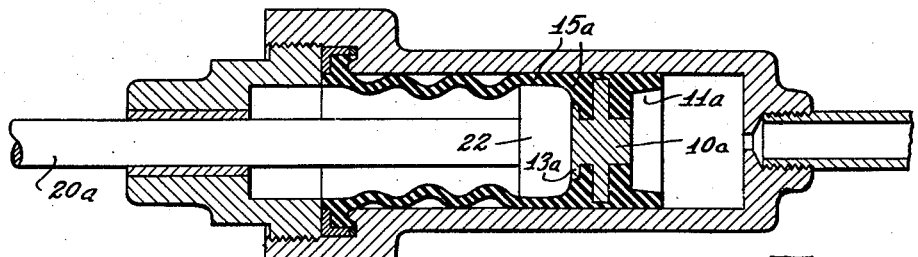
Figure 3:
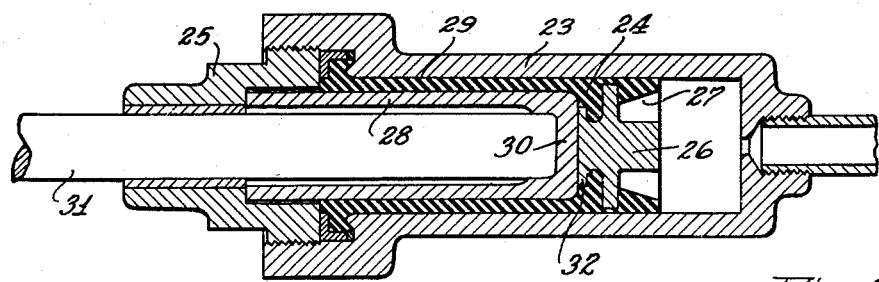
Figure 4:
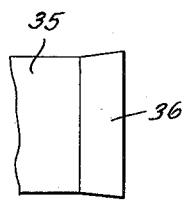

Figures 1, 2 and 3 are longitudinal cross sections of a piston and cylinder arrangement, each section illustrating a different structural form as compared with the others, and Fig. 4 is an elevation of a detail.

Like characters of reference are employed throughout to designate corresponding parts.

With reference to Fig. 1 the numeral 1 designates a cylinder having one end closed by an integral wall 2 having a port 3 therein to which a conduit 4 is connected. In the cylinder 1 is formed an annular shoulder 5, spaced inwardly from the open end and surrounded by an axially extended annular part 6. The annular part 6 is internally threaded at 7 for the reception of an externally threaded cylinder head 8.

Received in the cylinder 1 is a piston formed of rubber or other elastic material, the piston comprising a head portion 9 in which is permanently secured a metallic insert 10. The face of the piston head 9 is recessed to provide a cup seal 11 and the metallic insert 10 has a circumferential flange 12 which reinforces the cup seal 11. The end of the insert 10 is provided with a relatively enlarged head 13 which combines with the flange 12 in forming a groove 14 which functions to increase the bond between the material of the piston and the metallic insert. In actual practice the piston is formed of rubber which is vulcanized in a mould and the metallic insert is placed in the mould prior to vulcanization with the result that the rubber adheres to the surface thereof. In the event, however, that a commercially practical substitute for rubber may be found the invention contemplates that, if necessary, the material of the piston may be cemented or glued to the material of the insert. An adhesive having the desired characteristics is found in "Latex", an adhesive having a rubber base.

The piston has a comparatively long skirt 15 having a bellows formation which permits a certain amount of expansion or contraction without stretching or compressing the material of which it is formed. The end of the skirt 15 is formed with a circumferential flange 16 in which is embedded a metallic ring 17 of angular cross section. The ring 17 is permanently secured to the skirt by an adhesive or it may be placed in a mould with rubber prior to vulcanization in which case the rubber will adhere thereto.

Between an edge of the ring 17 and the shoulder 5 is provided a seal 18 and when the head 8 is tightly screwed into place it presses the ring 17 into tight engagement with the seal 18. A pressure developed seal is thus provided between the skirt and cylinder. At the same time a part of the flange 16 is compressed between the head 8 and the shoulder 5. In order to increase the effectiveness of the sealing action the shoulder 5 is provided with a rounded bead which is actually embedded in the flange 16, the head being rounded so that it will not puncture the flange.

The head 8 has an axial bore 19 through which a rod 20 extends. The end of the rod engages the head 13 on the metallic insert member 10. Although the rod 20 is illustrated as supported in a bearing 21 it will be understood that the fit between the rod and bearing is sufficiently loose to permit the free entrance or exit of air therethrough.

For convenience in describing the function of the described embodiment of the invention it will be assumed that the part of the cylinder 1 between the head of the piston and the wall 2 and the line 4 are all previously filled with liquid. Supposing that pressure is placed on the rod 20, by means external to the device and not illustrated here, the tendency is for the piston to move the liquid from the cylinder 1 and thereby build up pressure on the liquid. The liquid in the cylinder 1 tends to deform the rubber of the piston head 9 by crowding it backwardly so that the head collapses. However, the flange 12 on the metallic insert 10 functions to change the direction of the crowding action so as to direct it against the wall of the cylinder with the result that the effectiveness of the sealing action increases as the pressure increases.

As the piston head moves in a direction toward the right hand side of the figure the skirt 15 must necessarily elongate. By providing the bellows construction elongation of the skirt may take place without any tendency of a stress being set up which would tend to pull the circumferential flange 16 from its sealing position between the head 8 and the shoulder 5. The seal at the end of the skirt therefore remains intact at all times to effectively prevent the escape from the cylinder of any liquid which might seep past the piston head 9.

In the embodiment shown in Fig. 2, to which figure reference is now had, the structure of the cylinder, the cylinder head and piston are identical. Therefore, in the interest of brevity a repeating of the description is avoided inasmuch as the same reference numerals and descriptive matter used in connection with Fig. 1 may be referred to for an understanding of the construction and assembly. In this form, however, the rod 20a has an enlarged head 22 which bears against the head 13a on the metallic insert 10a. The head 22 is formed of a diameter sufficiently large whereby it presses a part of the piston skirt 15a into engagement with the wall of the cylinder. Where in the first described form the flange 12 crowds the rubber, under pressure of liquid, into engagement with the wall of the cylinder, the head 22 functions in like manner only in a reverse direction. When pressure is applied on the rod 20a from a source or by means external to the device the tendency of the head 22 is to spread the rubber of the piston head. Such a tendency increases proportionately as the pressure on the rod increases and accordingly the efficiency of the seal increases as the pressure increases. In this form the end of the piston is cupped at 11a and a triple sealing action is provided inasmuch as the liquid pressure spreads the cupped part, the head 22 spreads the skirt part and the end of the skirt is secured with respect to the cylinder in the manner above described.

In Fig. 3 there is shown a cylinder 23 with an elastic piston 24 secured therein in the manner above described by a cylinder head 25. As in the above described forms the piston 24 has a metallic insert 26 in its head end, the face of which is cupped as at 27. In this form a tubular element 28 is inserted within the skirt 29 of the piston and has a closed end 30 bearing against the metallic insert 26. The open end of the element 28 bears against the head 25 and a rod 31, which extends through the head 25 bears against the end wall 30 of the tubular element.

The tubular element 28 is formed with a diameter larger than the head 32 on the metallic insert 26 with the result that when the element 28 is moved it tends to press the rubber of the piston into contact with the wall of the cylinder. This form therefore includes the advantages of the head 22, above described. It has an added advantage in that it tends to press the skirt of the piston into engagement with the wall of the cylinder throughout its entire length when it is in its inoperative position shown in the drawing.

When the tubular element 28 is moved toward the right hand side of Fig. 3 the skirt of the piston will be stretched and while it is in a stretched position it will naturally be slightly smaller in thickness. In the event that liquid should seep past the piston head the skirt, when resuming its normal thickness, will force that liquid back into the cylinder to a position in advance of the piston head.

As pointed out in connection with Fig. 1 actual stretching of the skirt is undesirable in the respect that the tension necessary to actually stretch the skirt tends to pull the circumferential flange from between the head and shoulder. However, in connection with this form wherein actual stretching of the skirt is contemplated it is pointed out that the disclosure illustrates a form of brake actuator, or a commonly called "compressor", and that the stroke of the piston only amounts to about three-eighths of an inch, or at most a half inch. The skirt is very long, therefore in comparison to the length of the stroke with the result that the amount of stretching of the skirt necessary to permit the stroke to take place does not place the same under an excessive tensional stress.

As shown in Fig. 4, where a fragment of a piston is illustrated, the piston head is flared outwardly immediately adjacent to its end. In this view the piston body is designated 35 and the flared part 36. The part 35 is formed of a diameter whereby it fits snugly in a cylinder and the flared part 36 is larger than the cylinder so that when it is placed in a cylinder it is in a compressed condition and its natural resiliency holds it in close contact with the wall of the cylinder. The effectiveness of the sealing action at the piston head is thus increased.

Although specific embodiments of the invention have been illustrated and described it will be understood that various changes may be made within the scope of the appended claims without departing from the spirit of the invention, and such changes are contemplated.

What I claim is—

1. In a piston and cylinder assemblage wherein the cylinder assembly includes a cylinder and a cylinder head movable relatively to each other and a fluid portage, the combination therewith of, a combined piston and seal operative to seal the piston chamber to prevent the escape of fluid, said combined piston and seal including an elastic sleeve, an annular inelastic member anchored to one of said sleeve, said member being anchored between a shoulder in the cylinder and the cylinder head and providing a pressure developed, non-leakage packing zone between the cylinder and head by tightening of the latter, the anchoring zone being positioned remote from the fluid portage and said sleeve extending from the former toward the latter, said sleeve having an imperforated transverse wall movable therewith and providing a piston head between the anchoring zone and the fluid portage for closing the unsecured end of said sleeve, and a rod extending through said sleeve and loosely engaging the inner surface of said transverse wall.

2. The combination claimed in claim 1 characterized in that said transverse wall has a metallic reenforcement embedded therein and rendering said wall less susceptible to deformation than the wall of said sleeve.

3. The combination claimed in claim 1 characterized in that said transverse wall has a metallic reenforcement embedded therein and rendering said wall less susceptible to deformation than the wall of said sleeve, and said reenforcement has a portion thereof exposed within said sleeve and constituting a bearing surface for contact by said rod.

4. The combination claimed in claim 1 characterized in that a metallic reenforcement is embedded in said transverse wall to render said wall less susceptible to deformation than the wall of said sleeve, said reenforcement having a portion exposed axially for engagement by said rod, and means in the cylinder head supporting said rod for engagement with the axially exposed portion of said reenforcement.

5. The combination claimed in claim 1 characterized in that a metallic reenforcement is embedded in said transverse wall to render said wall less susceptible to deformation than the wall of said sleeve, said reenforcement having a portion exposed axially for engagement by said rod, and means on said rod for pressing said sleeve into engagement with the cylinder for at least a portion of the length thereof.

6. The combination claimed in claim 1 characterized in that a metallic reenforcement is embedded in said transverse wall to render said wall less susceptible to deformation than the wall of said sleeve, said reenforcement having a portion exposed axially for engagement by said rod, and said rod having an enlargement thereon engaging the axially disposed portion of said reenforcement and a portion of said sleeve to press a portion of the latter into engagement with the wall of the cylinder.

7. The combination claimed in claim 1 characterized in that a metallic reenforcement is embedded in said transverse wall to render said wall less susceptible to deformation than the wall of said sleeve, said reenforcement having a portion exposed axially, and a rigid element received in said sleeve and engaged by said rod and normally pressing the sleeve into engagement with the wall of the cylinder.

8. The combination claimed in claim 1 characterized in that a metallic reenforcement is embedded in said transverse wall to render said wall less susceptible to deformation than the wall of said sleeve, said reenforcement having a portion exposed axially, and a rigid element received in said sleeve and engaged by said rod and normally pressing the same into engagement with the wall of the cylinder, said element also having a portion engaging said transverse wall outwardly of the exposed portion of the reenforcement.

CLAUDE SAUZEDDE.